(12) United States Patent
Yamagishi (10) Patent No.: US 9,061,579 B2
(45) Date of Patent: Jun. 23, 2015

(54) AIR INTAKE DEVICE IN SADDLE RIDING TYPE VEHICLE

(71) Applicant: HONDA MOTOR CO., LTD, Tokyo (JP)

(72) Inventor: Naoto Yamagishi, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 35 days.

(21) Appl. No.: 13/947,762

(22) Filed: Jul. 22, 2013

(65) Prior Publication Data

US 2014/0041954 A1 Feb. 13, 2014

(30) Foreign Application Priority Data

Aug. 8, 2012 (JP) ................................ 2012-176015
Apr. 17, 2013 (JP) ................................ 2013-086323

(51) Int. Cl.
*B60K 13/02* (2006.01)
*F02M 35/10* (2006.01)
*F02M 35/04* (2006.01)
*F02M 35/16* (2006.01)
*B62J 99/00* (2009.01)
*B62K 11/04* (2006.01)
*F02M 53/08* (2006.01)
*F02M 69/04* (2006.01)

(52) U.S. Cl.
CPC .......... *B60K 13/02* (2013.01); *F02M 35/10216* (2013.01); *F02M 35/044* (2013.01); *F02M 35/048* (2013.01); *F02M 35/162* (2013.01); *B62J 99/00* (2013.01); *B62K 11/04* (2013.01); *F02M 53/08* (2013.01); *F02M 69/043* (2013.01); *F02M 69/044* (2013.01)

(58) Field of Classification Search
CPC ............................. B62K 11/00; F02M 35/162
USPC ........................................ 180/218, 219, 68.3
See application file for complete search history.

(56) References Cited

U.S. PATENT DOCUMENTS

| | | | | |
|---|---|---|---|---|
| 4,756,380 A * | 7/1988 | Uehara | ........................ | 180/227 |
| 6,325,169 B1 * | 12/2001 | Tateshima et al. | ............ | 180/219 |
| 6,478,105 B2 * | 11/2002 | Okuma | ........................ | 180/219 |
| 7,290,526 B2 * | 11/2007 | Maruo et al. | ............. | 123/339.14 |
| 7,438,738 B2 * | 10/2008 | Uneta et al. | .................. | 55/385.3 |
| 7,465,329 B2 * | 12/2008 | Oshima | ........................ | 55/385.3 |

(Continued)

FOREIGN PATENT DOCUMENTS

JP 2011-137428 A 7/2011

*Primary Examiner* — John Walters
*Assistant Examiner* — Brian Swenson
(74) *Attorney, Agent, or Firm* — Westerman, Hattori, Daniels & Adrian, LLP (57) ABSTRACT

In a saddle riding type vehicle in which a connecting tube that connects between an air cleaner placed behind a rear cushion unit extending vertically behind an engine body and a throttle body placed in front of the rear cushion unit is placed to pass by a lateral side of the rear cushion unit, adhesion of an injected fuel to an inner wall surface of an air intake passage is suppressed while a fuel injection valve is placed behind the throttle body, whereby stabilization of an air-fuel ratio is achieved. An air cleaner includes a cleaner element, and a support case supporting the cleaner element while forming a purification chamber together with the cleaner element. Here, a rear end portion of a connecting tube is connected to the support case. A fuel injection valve, whose direction of injection is oriented to the inside of a throttle body, is attached to the support case.

9 Claims, 11 Drawing Sheets

(56) References Cited

U.S. PATENT DOCUMENTS

| | | | |
|---|---|---|---|
| 7,681,678 B2* | 3/2010 | Shiraishi | 180/68.3 |
| 8,033,355 B2* | 10/2011 | Tokisato | 180/219 |
| 8,584,788 B2* | 11/2013 | Ishibe | 180/309 |
| 8,657,050 B2* | 2/2014 | Yamaguchi | 180/68.3 |
| 2011/0174273 A1* | 7/2011 | Otsuka et al. | 123/470 |

* cited by examiner

AIR INTAKE DEVICE IN SADDLE RIDING TYPE VEHICLE

CROSS-REFERENCE TO RELATED APPLICATIONS

The present application claims priority under 35 U.S.C. §119 to Japanese Patent Application No. 2012-176015, filed Aug. 8, 2012, and to Japanese Patent Application No. 2013-086323, filed Apr. 17, 2013, the contents of which are incorporated herein, by reference, in their entirety.

TECHNICAL FIELD

The present invention relates to a saddle riding type vehicle in which an engine body having an air intake port in a rear sidewall is mounted on a vehicle body frame below a main frame, the vehicle body frame including a head pipe which steerably supports a front fork pivotally supporting a front wheel and the main frame which extends rearward from the head pipe, a rear wheel is pivotally supported by a rear portion of a swing arm vertically swingably supported either by the vehicle body frame or by the engine body, a rear cushion unit provided between the vehicle body frame and the swing arm is placed to extend vertically behind the engine body, and a connecting tube connecting between an air cleaner placed behind the rear cushion unit and a throttle body placed in front of the rear cushion unit and connected to the air intake port is placed to pass by a lateral side of the rear cushion unit. More specifically, the present invention relates to an improvement in an air intake device.

BACKGROUND OF THE INVENTION

Japanese Patent Application Publication No. 2011-137428 makes known an air intake device for a motorcycle in which a rear cushion unit is placed to extend vertically behind an engine body, a connecting tube guiding air from an air cleaner placed behind the rear cushion unit to a throttle body placed in front of the rear cushion unit is formed to pass by a lateral side of the rear cushion unit, and a fuel is injected from a fuel injection valve to a portion upstream of a throttle valve of the throttle body.

SUMMARY OF THE INVENTION

However, according to the air intake device disclosed in Japanese Patent Application Publication No. 2011-137428 mentioned above, the fuel injection valve placed behind the rear cushion unit is attached to an upper part of the connecting tube which is formed to pass by the lateral side of the rear cushion unit extending vertically, and a direction of fuel injection crosses a direction of intake air circulation inside the connecting tube. Hence, there is a problem that an air-fuel ratio is difficult to stabilize due to adhesion of the fuel injected from the fuel injection valve to an inner wall surface of the connecting tube.

An air intake device in a saddle riding type vehicle is provided in which a connecting tube connecting between an air cleaner and a throttle body is placed to pass by a lateral side of a rear cushion unit and a fuel injection valve is placed behind the throttle body, and which is capable of suppressing adhesion of an injected fuel to an inner wall surface of an air intake passage and achieving stabilization of an air-fuel ratio.

A first aspect is an air intake device in a saddle riding type vehicle in which, an engine body having an air intake port in a rear sidewall is mounted on a vehicle body frame below a main frame, the vehicle body frame including a head pipe which steerably supports a front fork pivotally supporting a front wheel and the main frame which extends rearward from the head pipe in such a manner that the engine body is placed below the main frame, a rear wheel is pivotally supported by a rear portion of a swing arm vertically swingably supported by any one of the vehicle body frame and the engine body, a rear cushion unit provided between the vehicle body frame and the swing arm is placed to extend vertically behind the engine body, and a connecting tube connecting between an air cleaner placed behind the rear cushion unit and a throttle body placed in front of the rear cushion unit and connected to the air intake port is placed to pass by a lateral side of the rear cushion unit. In the air intake device, the air cleaner includes: a cleaner element; and a support case supporting the cleaner element while forming a purification chamber together with the cleaner element, a rear end portion of the connecting tube being connected to the support case, and a fuel injection valve, whose direction of injection is oriented to inside of the throttle body, is attached to the support case.

Meanwhile, in a second aspect, in addition to the configuration of the first aspect, the support case includes a cylindrical portion which forms the purification chamber inside and extends between the cleaner element and the connecting tube, a recessed portion is formed in a sidewall of the cylindrical portion by inwardly setting back part of the sidewall, and the fuel injection valve is attached to the sidewall of the cylindrical portion in such a manner that at least part of the fuel injection valve is housed inside the recessed portion.

In a third aspect, in addition to the configuration of the second aspect, an attachment hole into which a tip end portion of the fuel injection valve is inserted is provided in a front wall surface of the recessed portion formed in the sidewall on one side in a vehicle width direction of the cylindrical portion, an attachment boss is placed in a projecting manner around the attachment hole, and a fuel joint into which a head portion of the fuel injection valve is fitted is fixed to the attachment boss.

In a fourth aspect, in addition to the configuration of the third aspect, a guide groove guiding a fuel hose being continuous with the fuel joint is formed in the sidewall of the cylindrical portion around the recessed portion.

In a fifth aspect, in addition to the configuration of the third aspect, the support case is made of a soft and lightweight material, and multiple hook portions configured to be elastically engaged with the fuel joint are provided on the sidewall of the cylindrical portion around the attachment boss.

In a sixth aspect, in addition to the configuration of any one of the third to fifth aspects, a cover member covering the cleaner element from a lateral side is formed to cover the recessed portion from a lateral side.

In a seventh aspect, in addition to the configuration of the first aspect, the support case includes: a cylindrical support case main body to which the rear end portion of the connecting tube is connected; and a support frame fastened to a rear end portion of the support case main body, an element support member is fastened to the support frame, the cleaner element covering a rear end portion of the support case is attached to the element support member, and the fuel injection valve is attached to the support frame.

In an eighth aspect, in addition to the configuration of the seventh aspect, a different fuel injection valve is attached to the throttle body, and a first fuel guide pipe to guide a fuel toward the different fuel injection valve and a second fuel guide pipe to guide the fuel toward the fuel injection valve attached to the support case extend from a Y-shaped branched pipe to pass by a throttle position sensor attached to the throttle body.

In a ninth aspect, in addition to the configuration of the eighth aspect, the branched pipe is placed on one side in a vehicle width direction of the throttle body, on the other side in the vehicle width direction of the connecting tube, a connection pipe is provided at a front end portion of the support case main body, the second fuel guide pipe connecting between the branched pipe and the connection pipe is arranged to cross over the connecting tube from above, and a third fuel guide pipe connecting between the fuel injection valve and the connection pipe attached to the support case is arranged inside the support case main body.

According to the first aspect, the rear end portion of the connecting tube, which is placed to pass by a lateral side of the rear cushion unit, is connected to the support case constituting part of the air cleaner placed behind the rear cushion unit while a front end portion of the connecting tube is connected to the throttle body, and the fuel injection valve is attached to the support case in such a manner as to orient the direction of injection to the inside of the throttle body. Thus, the fuel injected from the fuel injection valve is efficiently guided to the air intake port and the fuel is less likely to adhere to inner wall surfaces of the connecting tube and an air intake passage inside the throttle body. In addition, it is possible to obtain an atomization period during which the latent heat of vaporization can be used by placing the fuel injection valve at a position relatively distant from the air intake port, and in conjunction therewith, to achieve stabilization of an air-fuel ratio and to enhance an engine performance.

Meanwhile, according to the second aspect, the support case includes the cylindrical portion which forms the purification chamber inside and extends between the connecting tube and the cleaner element. Thus, it is possible to increase the volume of the purification chamber and to enhance the engine performance by use of the stabilized intake air. In addition, at least part of the fuel injection valve is housed inside the recessed portion formed on the sidewall of the cylindrical portion. Thus, it is possible to reduce a bulge of the fuel injection valve out of the support case and prevent an increase in size of the vehicle body, thereby improving a rider's ease of straddling. It is also possible to perform a maintenance work on the fuel injection valve from the outside of the support case and thereby enhance maintainability.

According to the third aspect, the recessed portion is formed in the one sidewall in the vehicle width direction of the cylindrical portion, the tip end portion of the fuel injection valve is inserted into the attachment hole provided in the front wall surface of the recessed portion, and the fuel joint into which the head portion of the fuel injection valve is fitted is fixed to the attachment boss provided in a projecting manner on the front wall surface of the recessed portion in such a way as to be placed around the attachment hole. Thus, the fuel injection valve is attached to the support case via the fuel joint. This, together with the shape of the recessed portion, makes it possible to suppress transmission of injection noise associated with an operation of the fuel injection valve to a rider.

According to the fourth aspect, the fuel hose being continuous with the fuel joint is guided by the guide groove formed in the sidewall of the cylindrical portion around the recessed portion. This facilitates positioning of the fuel joint relative to the attachment boss, and an assembly performance can be improved accordingly.

According to the fifth aspect, the fuel joint can be temporarily fastened to the support case by elastically engaging the multiple hook portions provided on the sidewall of the cylindrical portion with the fuel joint around the attachment boss. This facilitates the work for fixing the fuel joint to the attachment boss.

According to the sixth aspect, the recessed portion is covered from the lateral side with the cover member covering the lateral side of the cleaner element. Thus, it is possible to protect the fuel injection valve and to suppress emission of operating noise of the fuel injection valve to the outside while reducing the number of components since it is unnecessary to provide a dedicated cover member for covering the fuel injection valve.

According to the seventh aspect, the support case is formed in combination with the cylindrical support case main body while the fuel injection valve is attached to the support frame fastened to the rear end portion of the support case main body, and the cleaner element is attached to the element support member, which is fastened to the support frame, in such a way that the cleaner element covers the rear end portion of the support case. Thus, it is possible to perform a maintenance work on the fuel injection valve during a maintenance work on the cleaner element while securing the area for the cleaner element. In addition, it is possible to improve a performance for cooling the fuel injection valve with the intake air circulating around the fuel injection valve.

According to the eighth aspect, in addition to the fuel injection valve attached to the support case, the other fuel injection valve is attached to the throttle body as well. This makes it possible to achieve more accurate control of a fuel injection amount. Further, the two fuel guide pipes to guide a fuel respectively toward the two fuel injection valves extend from the Y-shaped branched pipe and pass by the throttle position sensor. Thus, it is possible to simplify a structure of the pipes to supply the fuel to both of the fuel injection valves while avoiding interference with the throttle body.

Further, according to the ninth aspect, the branched pipe is placed on one side in the vehicle width direction of the throttle body, the second fuel guide pipe whose one end is connected to the branched pipe passes above the connecting tube and, on the other side in the vehicle width direction, connected to the connection pipe located at the front end portion of the support case main body, and the third fuel guide pipe connecting between the fuel injection valve and the connection pipe attached to the support case is arranged inside the support case main body. Thus, it is possible to inhibit pulsation caused by changes in pressure at the two fuel injection valves from affecting the two fuel injection valves by providing relatively large lengths of the second and third fuel guide pipes.

BRIEF DESCRIPTION OF THE DRAWINGS

The advantages of the invention will become apparent in the following description taken in conjunction with the drawings, wherein.

DETAILED DESCRIPTION OF THE INVENTION

Embodiments will be described below with reference to the drawings accompanying herewith. It is to be noted that, in the following descriptions, the front and rear, the right and left, and the up and down refer to the directions viewed from a rider riding on a saddle riding type vehicle.

A first embodiment will be described with reference to FIG. 1 to FIG. 8. First, in FIG. 1, this saddle riding type vehicle is, for example, a motorcycle for motocross, and its vehicle body frame F includes a head pipe 13 steerably supporting a front fork 11 that pivotally supports a front wheel WF and a steering handlebar 12 in a bar shape, a pair of right and left main frames 14 extending rearward and downward from the head pipe 13, a down frame 15 extending rearward and downward from the head pipe 13 at a steeper angle than that of the main frames 14, a pair of right and left lower frames 16 connected to a lower end portion of the down frame 15 and extending rearward, a pair of right and left pivot plates 17 extending downward with their upper end portions joined to rear end portions of the main frames 14 and with their lower end portions connected to rear end portions of both the lower frames 16, an upper cross member 18 provided between the upper end portions of the pivot plates 17, a lower cross member 19 provided between the lower end portions of the pivot plates 17, a pair of right and left seat rails 20 extending rearward with their upper end portions connected to the upper cross member 18, a pair of right and left rear frames 21 connecting between intermediate portions in a vertical direction of both the pivot plates 17 and rear portions of both the seat rails 20, and a substantially U-shaped reinforcement frame 22 connecting between a lower part of the down frame 15 and both the main frames 14.

Figure 1:
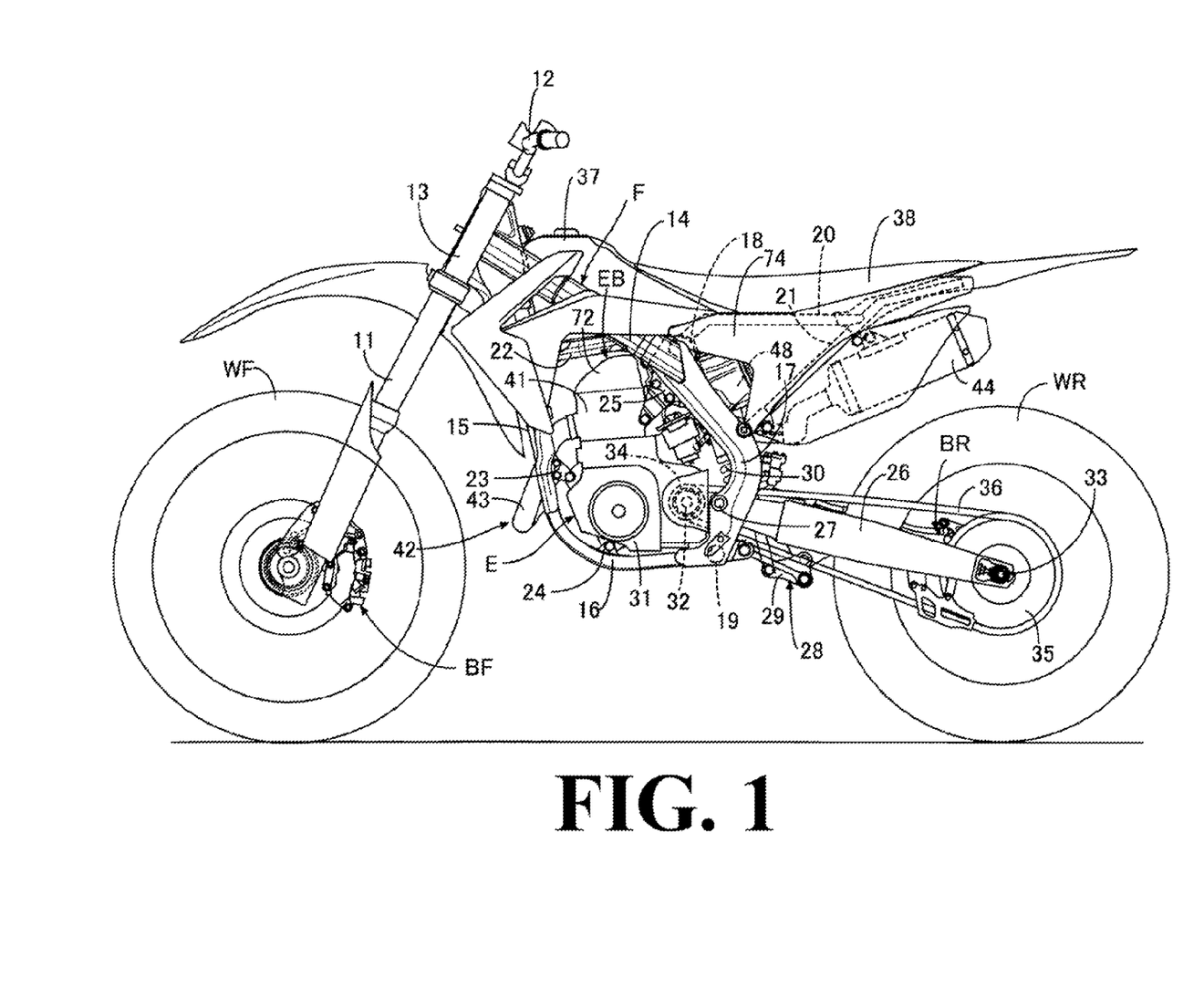
FIG. 1 is a left side view of a motorcycle of a first embodiment.

An engine body EB of a single-cylinder engine E is mounted on the vehicle body frame F below the main frames 14. A front part of the engine body EB is supported by the down frame 15 via a first engine hanger 23. A lower part of the engine body EB is supported by second engine hangers 24 provided on the lower frames 16. An upper part of the engine body EB is supported by upper parts of the pivot plates 17 via third engine hangers 25.

An axle 33 of a rear wheel WR is rotatably supported by a rear end portion of a swing arm 26 which extends in a front-rear direction while sandwiching the rear wheel WR from two sides. A front end portion of the swing arm 26 is vertically swingably supported either by the engine body EB or by the vehicle body frame F. In this embodiment, the front end portion of the swing arm 26 is vertically swingably supported by lower parts of the pivot plates 17 of the vehicle body frame F via a support shaft 27.

A link mechanism 28 is provided between the lower cross member 19 of the vehicle body frame F and the swing arm 26. A vertically extending rear cushion unit 30, which is placed between the pair of right and left pivot plates 17 that are placed behind the engine body EB, is provided between a link member 29 that constitutes part of the link mechanism 28 and the upper cross member 18. Specifically, a lower end portion of the rear cushion unit 30, which is placed behind the engine body EB in such a manner that an upper end portion thereof is connected to the upper cross member 18 of the vehicle body frame F, is connected to the swing arm 26 via the link member 29 of the link mechanism 28.

A not-illustrated transmission is housed inside a crankcase 31 constituting part of the engine body EB. An output shaft 32 of the transmission protrudes leftward from the crankcase 31. An endless chain 36 is wound around a drive sprocket 34 provided on the output shaft 32 and around a driven sprocket 35 provided on the axle 33 of the rear wheel WR.

Meanwhile, a fuel tank 37 is provided on both the main frames 14 above the engine body EB, and a riding seat 38 is placed behind the fuel tank 37 and supported by the seat rails 20.

A front wheel disc brake BF can brake rotation of the front wheel WF while a rear wheel disc brake BR can brake rotation of the rear wheel WR.

An air exhaust device 42 connected to a cylinder head 41 that constitutes part of the engine body EB includes an exhaust pipe 43 connected to a front wall surface of the cylinder head 41, and a pair of right and left silencers 44 placed on both sides in the vehicle width direction of the rear wheel WR and connected to the exhaust pipe 43.

Figure 2:
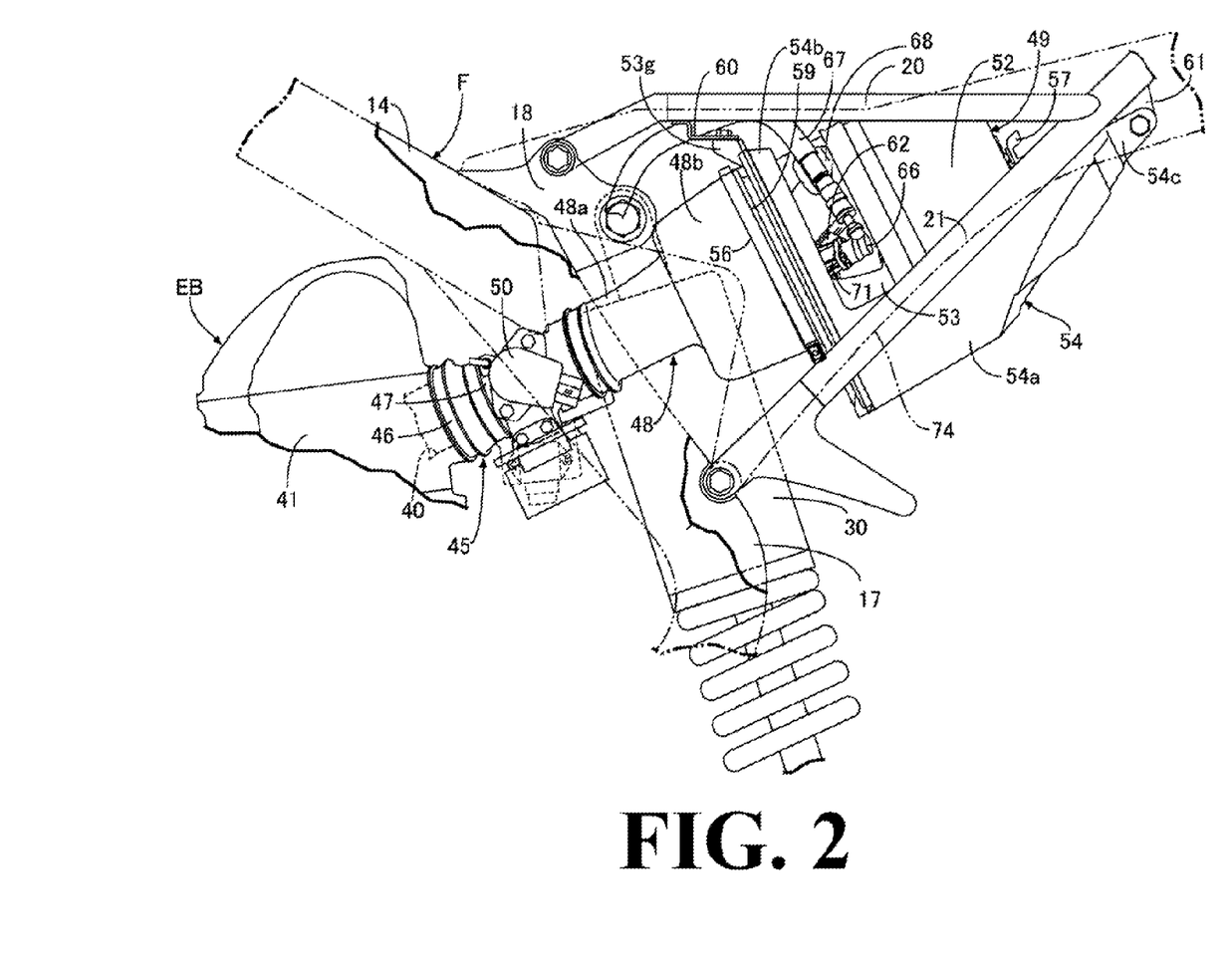
FIG. 2 is a left side view of the vicinity of an air intake device viewed in the same direction as in FIG. 1.

In FIG. 2, an air intake port 40 is provided in a rear sidewall of the cylinder head 41. An air intake device 45 being continuous with the air intake port 40 includes an air intake pipe 46 having a downstream end connected to a rear wall surface of the cylinder head 41 in such a manner as to communicate with the air intake port 40, a throttle body 47 having a downstream end connected to an upstream end of the air intake pipe 46, a connecting tube 48 having a downstream end connected to an upstream end of the throttle body 47, and an air cleaner 49 to which an upstream end of the connecting tube 48 is connected.

The air cleaner 49 is placed behind the rear cushion unit 30 and below the riding seat 38. Meanwhile, the throttle body 47 is placed in front of the rear cushion unit 30 and a throttle position sensor 50 is attached to the throttle body 47. The connecting tube 48 is placed to pass by a lateral side of the rear cushion unit 30 (a left side in this embodiment).

Figure 3:
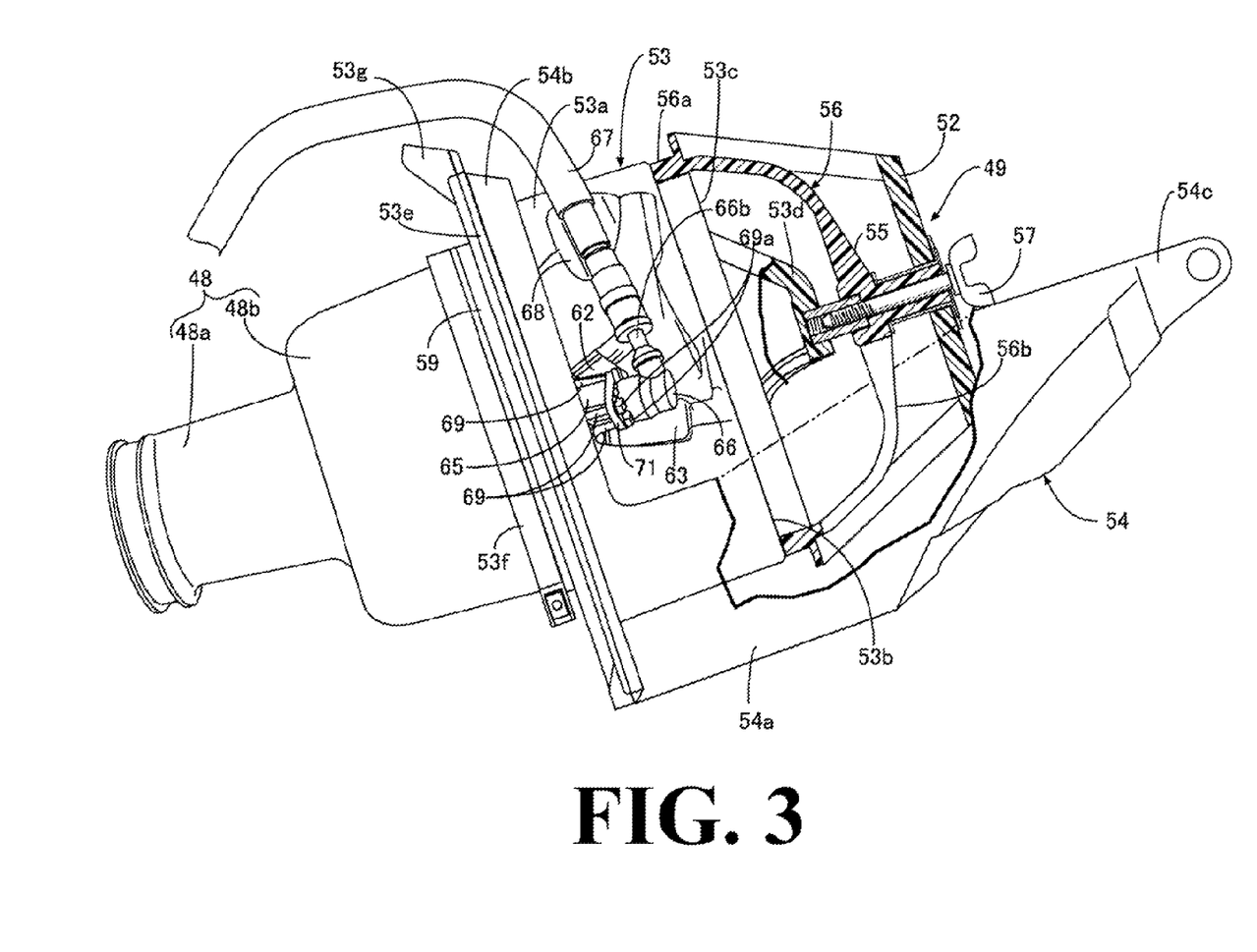
FIG. 3 is a partially cutaway left side view showing an air cleaner in the state of attaching a fuel injection valve and showing a connecting tube.

Referring to FIG. 3, the air cleaner 49 includes a cleaner element 52, a support case 53 which supports the cleaner element 52 and to which a rear end portion of the connecting tube 48 is connected, and a cleaner case 54 covering the cleaner element 52 from below.

Figure 4:
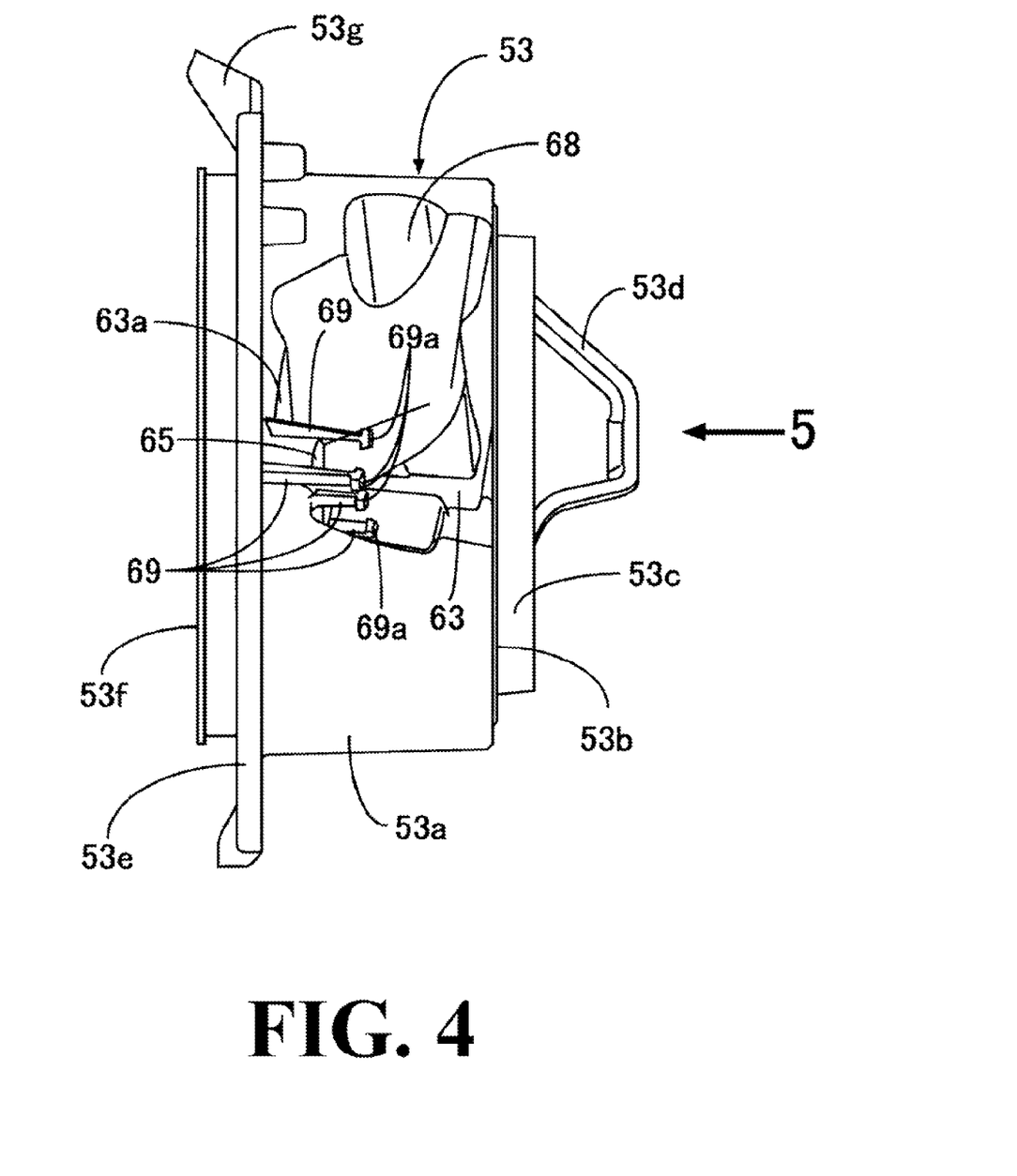
FIG. 4 is a left side view of a support case.
Figure 5:
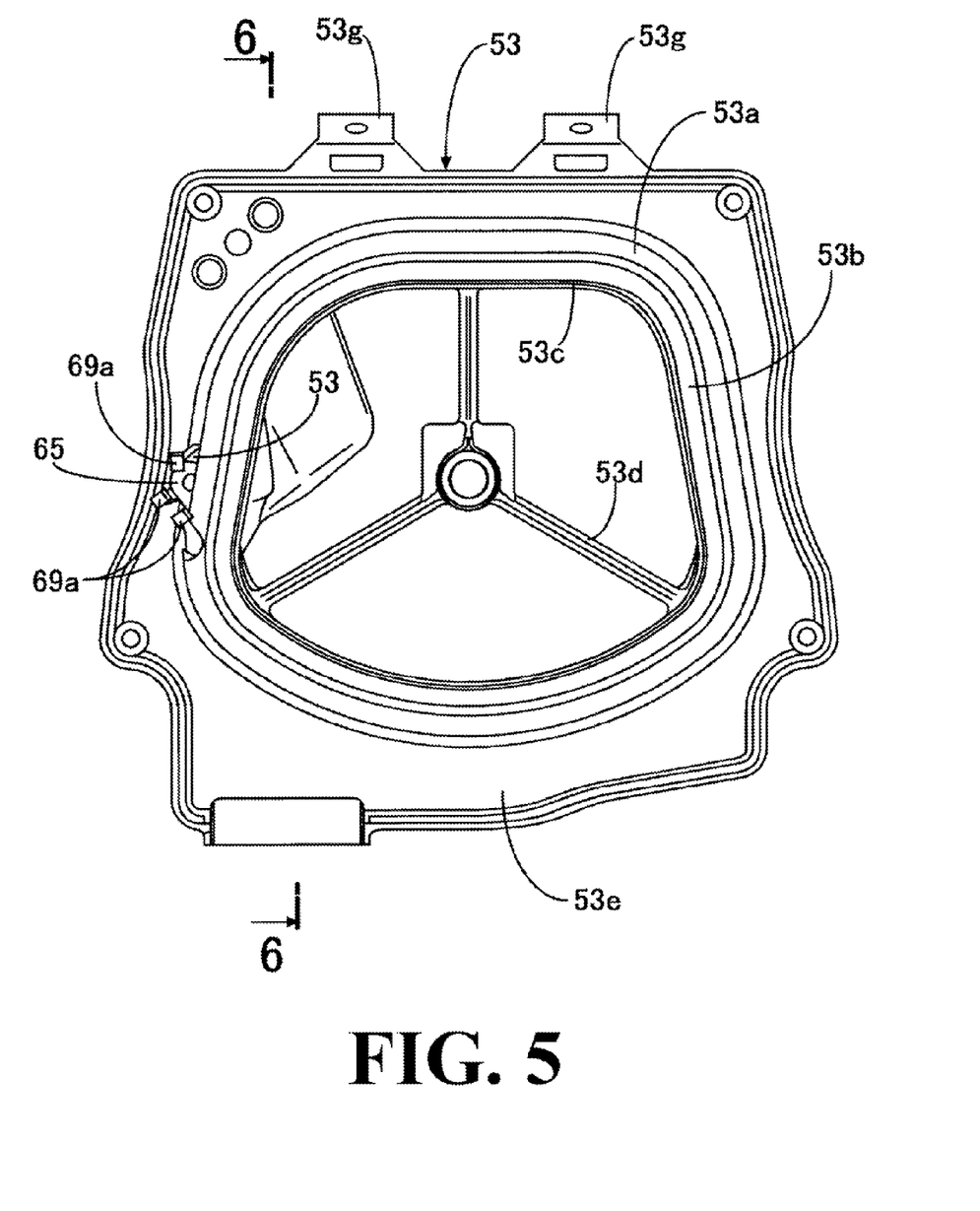
FIG. 5 is a diagram viewed along an arrow 5 in FIG. 4.
Figure 6:
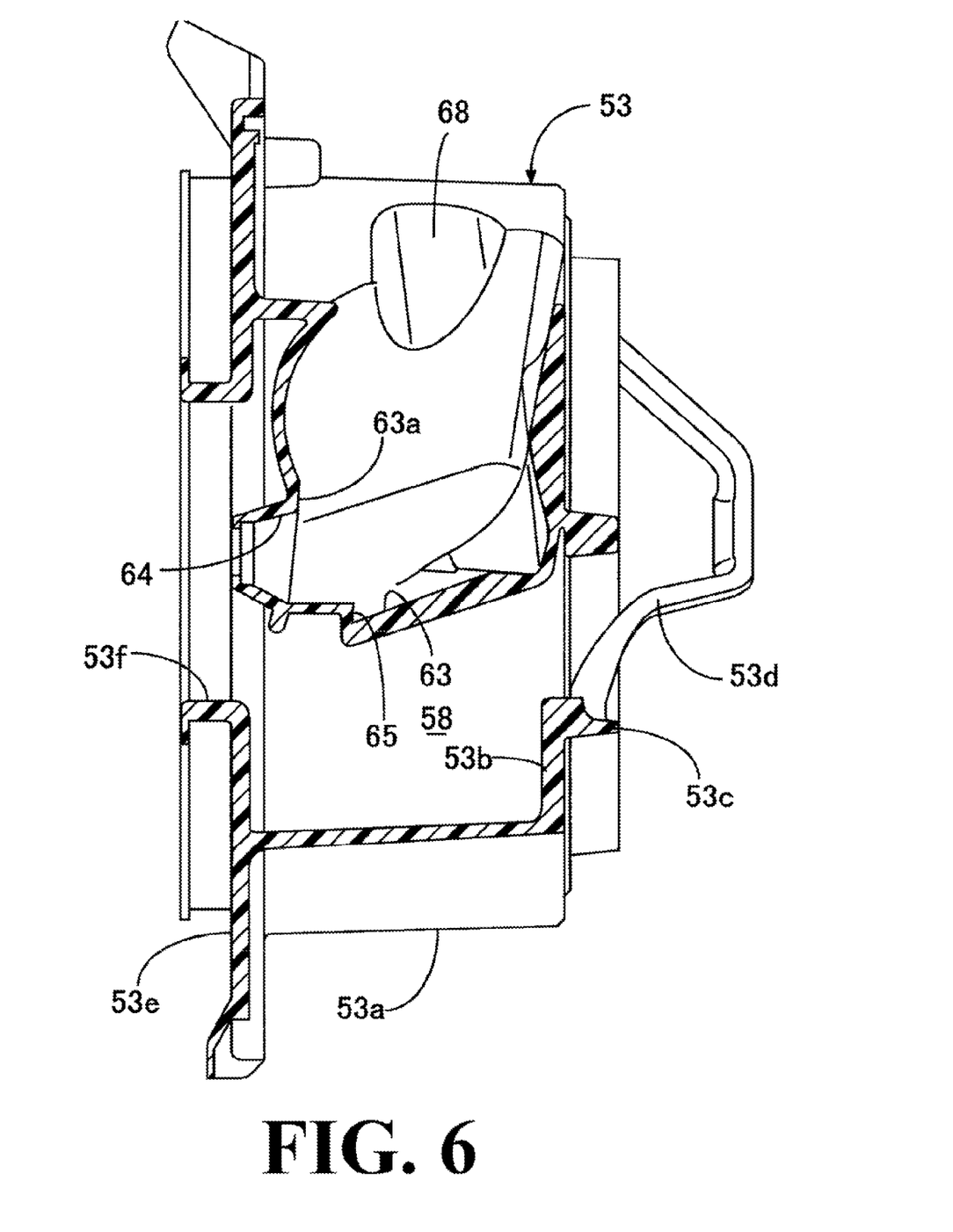
FIG. 6 is a cross-sectional view taken along the 6-6 line in FIG. 5.

Referring to FIG. 4 to FIG. 6 together, the support case 53 is made of a soft and lightweight material such as a synthetic resin and integrally includes a cylindrical portion 53a extending between the cleaner element 52 and the connecting tube 48, an inward flange portion 53b protruding inward from a rear end of the cylindrical portion 53a, a support cylinder portion 53c slightly projecting rearward from an inner periphery of the inward flange portion 53b, a support frame portion 53d connected to multiple positions in a circumferential direction of an inner periphery of the support cylinder portion 53c and projecting rearward from the support cylinder portion 53c, a flat plate portion 53e connected perpendicularly to a front end of the cylindrical portion 53a in such a manner as to protrude inward and outward from the front end of the cylindrical portion 53a, and a connecting cylinder portion 53f slightly projecting forward from an inner periphery of the flat plate portion 53e. As shown in FIG. 3, a nut 55 is fixed to the center of the support frame portion 53d.

In the meantime, the cleaner element 52 is attachably and detachably attached to an element support member 56. As shown in FIG. 3, the element support member 56 integrally includes a cylinder portion 56a fitted to the support cylinder portion 53c of the support case 53 and being in contact with the inward flange portion 53b from behind, and an element support frame portion 56b being connected to multiple positions in a circumferential direction of an inner periphery of the cylinder portion 56a. The cleaner element 52 is attached to the element support member 56 to cover the element support member 56. In addition, a screw member 57 is inserted into the center of the element support frame portion 56b. As the screw member 57 is screwed into the nut 55, the cleaner element 52 is supported by the support case 53 together with the element support member 56. Hence, a purification chamber 58 is formed inside the cylindrical portion 53a of the support case 53.

The cleaner case 54 integrally includes a case main portion 54a having a transverse sectional shape of an arc which is open upward to cover the cleaner element 52 from below, and a cylindrical connecting portion 54b being continuous with a front end of the case main portion 54a. The cylindrical connecting portion 54b is connected to an outer peripheral portion of the flat plate portion 53e of the support case 53.

The connecting tube 48 is placed to pass by the left side of the rear cushion unit 30, integrally includes a cylindrical tube main portion 48a having a downstream end portion connected to the throttle body 47, and a funnel portion 48b integrally connected to the tube main body 48a, and is made of rubber, for example. The tube main portion 48a is formed to be curved to bypass the rear cushion unit 30 while keeping its cross-sectional area almost constant across the entire length in an axial direction. The funnel portion 48b is formed into a shape of a funnel which spreads gradually from an outer periphery of an intermediate portion of the tube main portion 48a toward the air cleaner 49.

Meanwhile, an end portion on the support case 53 side of the funnel portion 48b is fitted into the connecting cylinder portion 53f of the support case 53. The funnel portion 48b of the connecting tube 48 is connected to the support case 53 by tightening a band 59 which is wound around an annular groove 55 on the outer periphery of the connecting cylinder portion 53f.

A pair of attachment plate portions 53g located away from each other in the vehicle width direction are integrally provided on an upper part of the flat plate portion 53e of the support case 53. As shown in FIG. 2, the attachment plate portions 53g are attached to stays 60 which are fixed to lower intermediate portions of the seat rails 20 of the vehicle body frame F. Meanwhile, a pair of attachment plate portions 54c are integrally provided on a rear end of the case main portion 54a of the cleaner case 54. The attachment plate portions 54c are attached to stays 61 which are fixed to rear portions of the rear frames 21 of the vehicle body frame F.

A fuel injection valve 62 is attached to the support case 53. A recessed portion 63 is formed in a sidewall on one side in the vehicle width direction of the cylindrical portion 53a of the support case 53 by inwardly setting back part of the sidewall. The fuel injection valve 62 is attached to the sidewall of the cylindrical portion 53a in such a way that at least part of the fuel injection valve 62 is housed inside the recessed portion 63. Moreover, in this embodiment, the connecting tube 48 is formed to pass by the left side of the rear cushion unit 30. In accordance therewith, the recessed portion 63 is formed in the left sidewall of the cylindrical portion 53a of the support case 53, and the fuel injection valve 62 is attached to the left sidewall of the cylindrical portion 53a in such a manner that the major part of the fuel injection valve 62 is housed inside the recessed portion 63.

Figure 7:
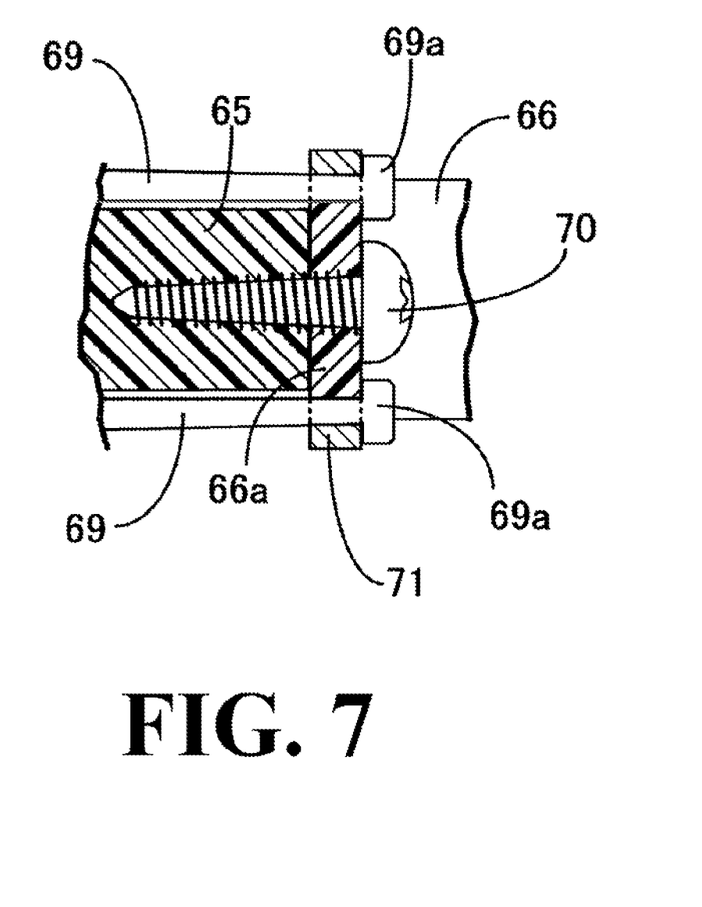
FIG. 7 is an enlarged cross-sectional view showing a state of fixation of a fuel joint to an attachment boss.
Figure 8:
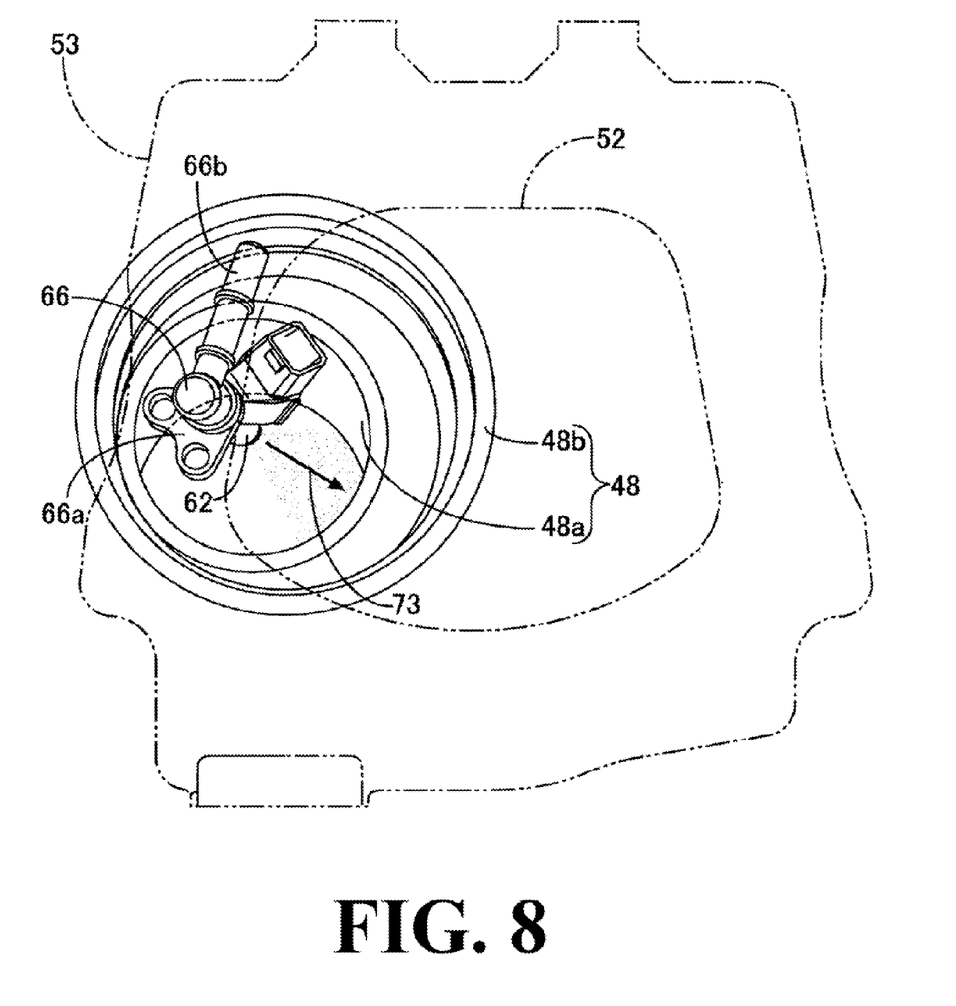
FIG. 8 is a diagram showing relative arrangement of the connecting tube and the fuel injection valve viewed from a rear side.

An attachment hole 64, into which a tip end portion of the fuel injection vale 62 is inserted, is provided in a front wall surface 63a of the recessed portion 63 formed in the left sidewall of the cylindrical portion 53a. In addition, an attachment boss 65 is placed in a projecting manner around the attachment hole 64, and a fuel joint 66, into which a head portion of the fuel injection valve 62 is fitted, is fixed to the attachment boss 65. Moreover, in this embodiment, as shown in FIG. 7, an attachment flange 66a provided on the fuel joint 66 is fastened to the attachment boss 65 by using a pair of tapping screws 70.

In addition, multiple, such as four, hook portions 69 having engagement claws 69a on their tip ends to be elastically engaged with the attachment flange 66a of the fuel joint 66, are integrally provided on the left sidewall of the cylindrical portion 53a around the attachment boss 65. The hook portions 69 are kept engaged with the attachment flange 66a by tightening a band 71, which is wound around the hook portions 69, in the state where the engagement claws 69a are engaged with the attachment flange 66a.

Meanwhile, a guide groove 68 guiding a fuel hose 67 being continuous with a connecting pipe 66b provided on the fuel joint 66, is formed in the left side wall of the cylindrical portion 53a around the recessed portion 63.

In this way, the fuel injection valve 62 is attached to the left sidewall of the support case 53. Here, a direction of injection of a fuel from the fuel injection valve 62 in the attached state is oriented to the inside of the throttle body 47. Specifically, the direction of injection of the fuel from the fuel injection valve 62 attached to the support case 53 is oriented as indicated with an arrow 73 in FIG. 8, and is set such that the injected fuel passes through the tube main portion 48a of the connecting tube 48, which is continuous with the support case 53 on the downstream side, and then reaches the inside of the throttle body 47.

In the meantime, the cleaner element 52 of the air cleaner 49 is covered from above with the riding seat 38 and is covered from below with the case main portion 54a of the cleaner case 54. Furthermore, the cleaner element 52 is also covered from lateral sides with a pair of right and left side covers 74, which are cover members placed below the riding seat 38 on both sides thereof. Of the side covers 74, the left side cover 74 is adjusted to cover the recessed portion 63 of the cylindrical portion 53a of the support case 53 from the lateral side.

Next, an operation of the first embodiment will be described. The air cleaner 49 placed behind the rear cushion unit 30 includes the cleaner element 52, and the support case 53 which supports the cleaner element 52 while forming the purification chamber 58 together with the cleaner element 52. The connecting tube 48 connecting between the throttle body 47 placed in front of the rear cushion unit 30 and the support case 53 is placed to pass by the lateral side of the rear cushion unit 30, and the fuel injection valve 62 whose direction of injection is oriented to the inside of the throttle body 47 is attached to the support case 53. Thus, the fuel injected from the fuel injection valve 62 is efficiently guided to the air intake port 40 and the fuel is less likely to adhere to inner wall surfaces of the connecting tube 48 and an air intake passage inside the throttle body 47. In addition, it is possible to obtain an atomization period during which the latent heat of vaporization can be used by placing the fuel injection valve 62 at a position relatively distant from the air intake port 40, and in conjunction therewith, to achieve stabilization of an air-fuel ratio and to enhance an engine performance.

Meanwhile, the support case 53 includes the cylindrical portion 53a which forms the purification chamber 58 inside and extends between the cleaner element 52 and the connecting tube 48. Accordingly, it is possible to increase the volume of the purification chamber 58 and to enhance the engine performance by use of the stabilized intake air. In addition, the recessed portion 63 is formed in the sidewall of the cylindrical portion 53a by inwardly setting back at least part of the sidewall, and the fuel injection valve 62 is attached to the sidewall of the cylindrical portion 53a in such a manner that at least part (major part in this embodiment) of the fuel injection valve 62 is housed inside the recessed portion 63. Thus, it is possible to reduce a bulge of the fuel injection valve 62 out of the support case 53 and prevent an increase in size of the vehicle body, thereby improving a rider's ease of straddling. It is also possible to perform a maintenance work on the fuel injection valve 62 from the outside of the support case 53 and thereby enhance maintainability.

Meanwhile, the attachment hole 64 into which the tip end portion of the fuel injection valve 62 is inserted is provided in the front wall surface 63a of the recessed portion 63 that is formed in one sidewall (the left sidewall in this embodiment) in the vehicle width direction of the cylindrical portion 53a. Moreover, the attachment boss 65 is placed in a projecting manner around the attachment hole 64, and the fuel joint 66 into which the head portion of the fuel injection valve 62 is fitted is fixed to the attachment boss 65. Thus, the fuel injection valve 62 is attached to the support case 53 via the fuel joint 66. This, together with the shape of the recessed portion 63, makes it possible to suppress transmission of injection noise associated with an operation of the fuel injection valve 62 to a rider.

In the meantime, the guide groove 68 guiding the fuel hose 67 being continuous with the fuel joint 66 is formed in the sidewall of the cylindrical portion 53a around the recessed portion 63. This facilitates positioning of the fuel joint 66 relative to the attachment boss 65, and an assembly performance can be improved accordingly.

Meanwhile, the support case 53 is made of a soft and lightweight material such as a synthetic resin, and the multiple hook portions 69 to be elastically engaged with the fuel joint 66 are provided on the sidewall of the cylindrical portion 53a around the attachment boss 65. Accordingly, the fuel joint 66 can be temporarily fastened to the support case 53 by elastically engaging the hook portions 69 with the fuel joint 66 around the attachment boss 65. This facilitates the work for fixing the fuel joint 66 to the attachment boss 65.

In addition, the side covers 74 covering the cleaner element 52 from the lateral sides are formed to cover the recessed portion 63 from the lateral sides. Thus, it is possible to protect the fuel injection valve 62 and to suppress emission of operating noise of the fuel injection valve 62 to the outside while reducing the number of components since it is unnecessary to provide a dedicated cover member for covering the fuel injection valve 62.

A second embodiment will be described with reference to FIG. 9 to FIG. 11. Note that portions corresponding to those in the first embodiment will be simply illustrated while being denoted by the same reference numerals and detailed description thereof will be omitted.

Figure 9:
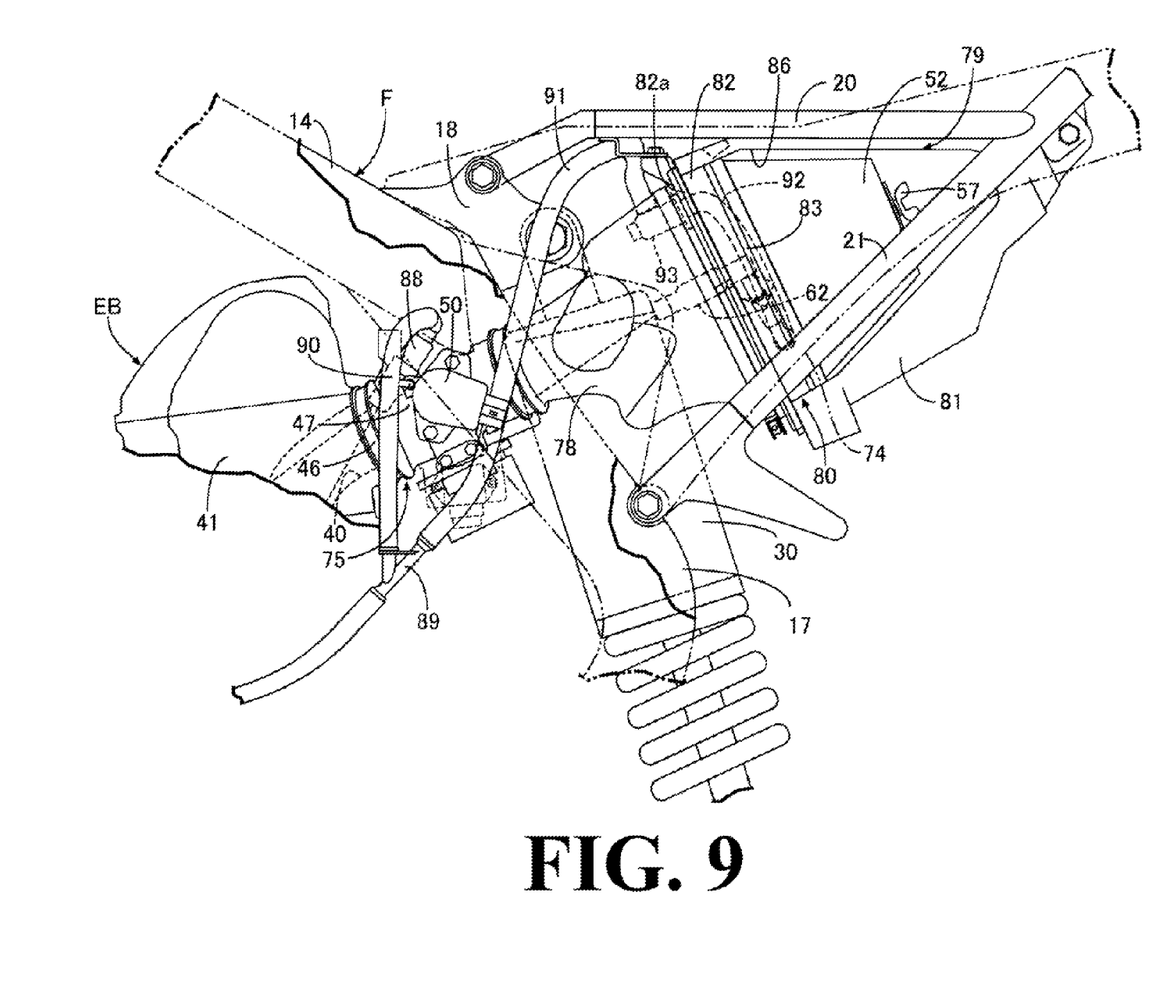
FIG. 9 is a side view of a second embodiment corresponding to FIG. 2.

First, in FIG. 9, an air intake device 75 being continuous with the air intake port 40 provided in the rear sidewall of the cylinder head 41 includes the air intake pipe 46 having the downstream end connected to the rear wall surface of the cylinder head 41 to communicate with the air intake port 40, the throttle body 47 having the downstream end connected to the upstream end of the air intake pipe 46 and to which the throttle position sensor 50 is attached, a connecting tube 78 having a downstream end connected to an upstream end of the throttle body 47, and an air cleaner 79 to which an upstream end of the connecting tube 78 is connected. The connecting tube 78 is placed to pass by the lateral side of the rear cushion unit 30 (the left side in this embodiment).

The air cleaner 79 includes the cleaner element 52, a support case 80 which supports the cleaner element 52 and to which a rear end portion of the connecting tube 78 is connected, and a cleaner case 81 covering the cleaner element 52 from below.

Figure 10:
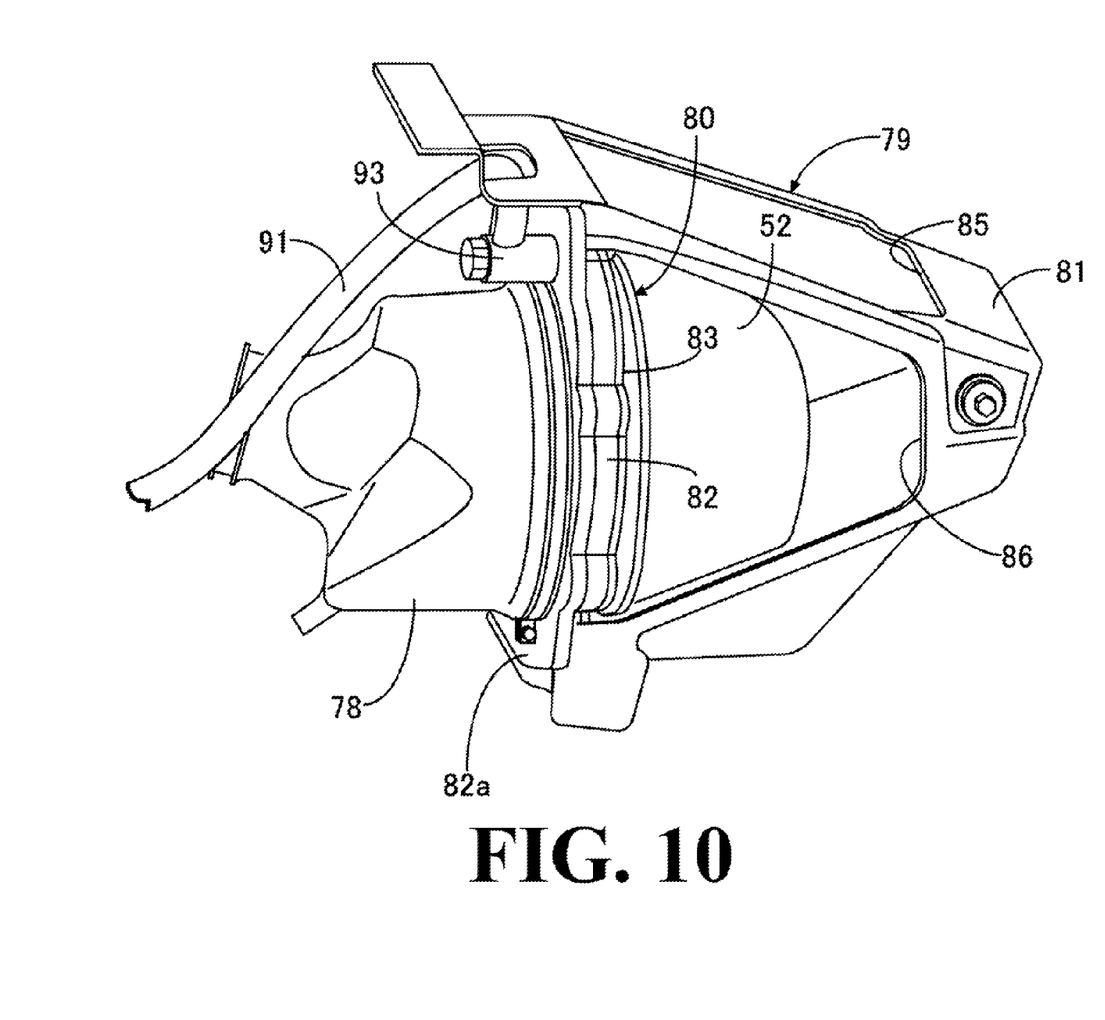
FIG. 10 is a perspective view of an air cleaner and a connecting tube.
Figure 11:
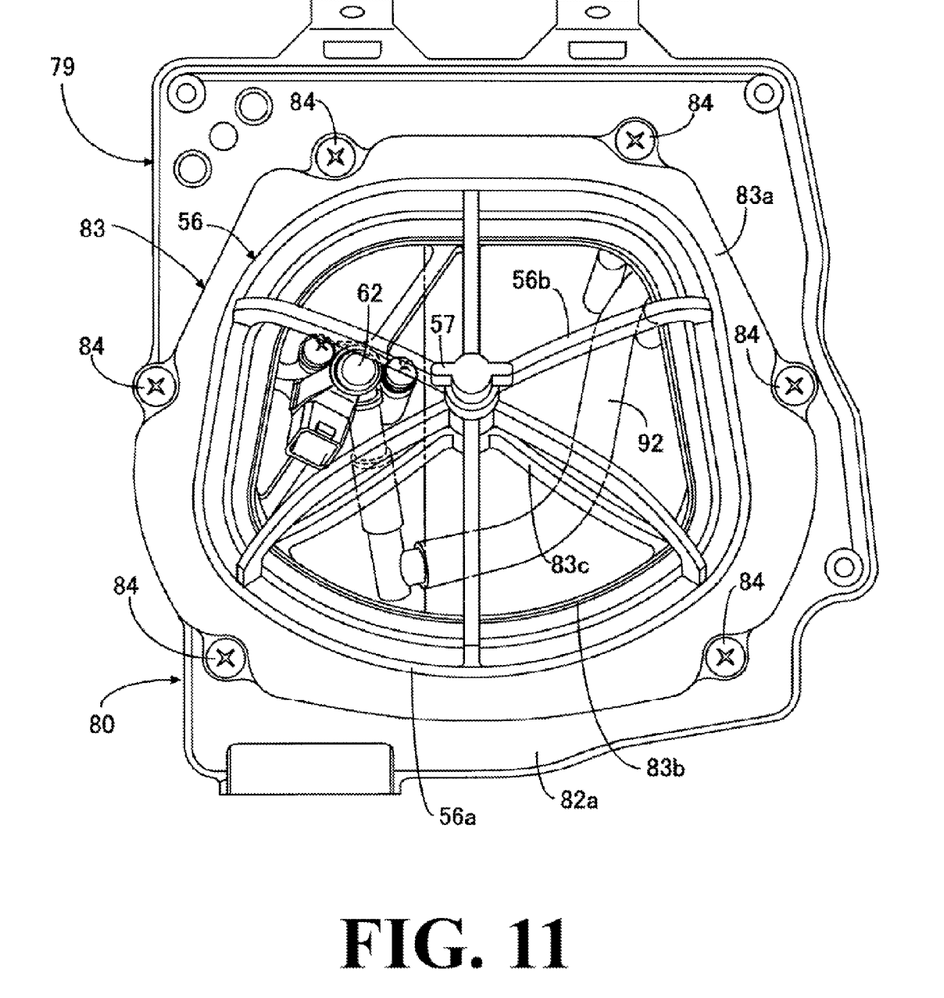
FIG. 11 is a perspective view of a support case to which an element support member is attached, which is viewed from behind while a cleaner element is detached therefrom.

Referring to FIG. 10 to FIG. 11 together, the support case 80 includes a support case main body 82 being formed into a cylindrical shape and having a flange portion 82a which is provided on its front end and designed to protrude laterally, and a support frame 83 fastened to a rear end of the support case main body 82.

The support frame 83 is made of a soft and lightweight material such as a synthetic resin, and integrally includes a ring plate portion 83a fastened to the rear end of the support case main body 82 with multiple screw members 84, a cylindrical frame support portion 83b being integrally continuous with an inner periphery of the ring plate portion 83a and projecting rearward, and a frame portion 83c being continuous with multiple positions in a circumferential direction of the frame support portion 83b and projecting rearward. A not-illustrated nut is fixedly provided at the center of the frame portion 83c.

In the meantime, the cleaner element 52 is attachably and detachably attached to the element support member 56, and the element support member 56 integrally includes the cylinder portion 56a surrounding the frame support portion 83b of the support frame 83 in the support case 80 and being in contact with the ring plate portion 83a from behind, and the element support frame portion 56b being connected to the multiple positions in the circumferential direction of the inner periphery of the cylinder portion 56a. The cleaner element 52 is attached to the element support member 56 to cover the element support member 56. In addition, the screw member 57 is inserted into a central portion of the element support frame portion 56b. As the screw member 57 is screwed into the nut, the cleaner element 52 is supported by the support case 80 together with the element support member 56.

The cleaner case 81 is formed into a box shape having a rectangular transverse section to cover the cleaner element 52. A front end portion of the cleaner case 81 is fastened to the flange portion 82a located at the front end of the support case main body 82 in the support case 80. Moreover, an upper intake port 85 covered with the riding seat 38 (see the first embodiment) from above is formed in an upper part of the cleaner case 81, while a lateral intake port 86 covered with the left side cover 74 (see the first embodiment) from the left side is formed in a left sidewall of the cleaner case 81.

The fuel injection valve 62 is attached to the frame portion 83b in the support frame 83 of the support case 80 in such a way that the direction of injection is oriented to the inside of the throttle body 47.

Meanwhile, another fuel injection valve 88 is attached to the throttle body 47, and a first fuel guide pipe 90 to guide a fuel toward the other fuel injection valve 88 and a second fuel guide pipe 91 to guide the fuel toward the fuel injection valve 62 attached to the support case 80 extend from a Y-shaped branched pipe 89 to pass by the throttle position sensor 50 attached to the throttle body 47.

In the meantime, the branched pipe 89 is placed on one side (the left side in this embodiment) in the vehicle width direction of the throttle body 47. Meanwhile, on the other side (the right side in this embodiment) in the vehicle width direction of the connecting tube 78, a connection pipe 93 is provided to the flange portion 82a located at the front end portion of the support case main body 82 in the support case 80. The second fuel guide pipe 91 connecting between the branched pipe 89 and the connection pipe 93 is arranged to cross over the connecting tube 78 from above. In addition, a third fuel guide pipe 92 connecting between the fuel injection valve 62 and the connection pipe 93 attached to the support case 80 is arranged inside the support case main body 82.

According to the second embodiment, the fuel injection valve 62 is attached to the support case 80 in such a way that the direction of injection is oriented to the inside of the throttle body 47 as in the first embodiment. Thus, the fuel injected from the fuel injection valve 62 is efficiently guided to the air intake port 40 and the fuel is less likely to adhere to inner wall surfaces of the connecting tube 78 and an air intake passage inside the throttle body 47. In addition, it is possible to obtain an atomization period during which the latent heat of vaporization can be used by placing the fuel injection valve 62 at a position relatively distant from the air intake port 40, and in conjunction therewith, to achieve stabilization of an air-fuel ratio and to enhance an engine performance.

In addition, the support case 80 includes the cylindrical support case main body 82 to which the rear end portion of the connecting tube 78 is connected, and the support frame 83 fastened to the rear end portion of the support case main body 82. The element support member 56 is fastened to the support frame 83, the cleaner element 52 covering the rear end portion of the support case 80 is attached to the element support member 56, and the fuel injection valve 62 is attached to the support frame 83. Thus, it is possible to perform a maintenance work on the fuel injection valve 62 during a maintenance work on the cleaner element 52 while securing the area for the cleaner element 52. In addition, it is possible to improve a performance for cooling the fuel injection valve 62 with the intake air circulating around the fuel injection valve 62.

Moreover, the other fuel injection valve 88 is attached to the throttle body 47, and the first fuel guide pipe 90 to guide the fuel toward the other fuel injection valve 88 and the second fuel guide pipe 91 to guide the fuel toward the fuel injection valve 62 attached to the support case 80 extend from the Y-shaped branched pipe 89 to pass by the throttle position sensor 50 attached to the throttle body 47. This makes it possible to achieve more accurate control of a fuel injection amount, and to simplify a structure of the pipes to supply the fuel to both of the fuel injection valves 88, 62 while avoiding interference with the throttle body 47.

Furthermore, the branched pipe 89 is placed on the one side in the vehicle width direction of the throttle body 47. On the other side in the vehicle width direction of the connecting tube 78, the connection pipe 93 is provided to the flange portion 82a located at the front end portion of the support case main body 82 in the support case 80. The second fuel guide pipe 91 connecting between the branched pipe 89 and the connection pipe 93 is arranged to cross over the connecting tube 78 from above. The third fuel guide pipe 92 connecting between the fuel injection valve 62 and the connection pipe 93 attached to the support case 80 is arranged inside the support case main body 82. Thus, it is possible to inhibit pulsation caused by changes in pressure at the two fuel injection valves 62, 88 from affecting the two fuel injection valves 62, 88 by providing relatively large lengths of the second and third fuel guide pipes 91, 92.

Although the embodiment of the present invention has been described above, it is to be noted that the present invention is not limited only to the above-described embodiment and various design changes are possible without departing from the present invention as defined in the claims.

I claim:

1. An air intake device for a saddle riding type vehicle, comprising:
    an air cleaner disposed behind a rear cushion unit of the saddle riding type vehicle;
    a throttle body disposed in front of the rear cushion unit; and
    a connecting tube connecting said air cleaner and said throttle body, said connecting tube being connected to an air intake port of an engine of the saddle riding type vehicle and being placed at a lateral side of the rear cushion unit,
    wherein the air cleaner comprises
        a cleaner element,
        a support case supporting said cleaner element and forming a purification chamber together with said cleaner element, a rear end portion of said connecting tube being connected to said support case, and
        a first fuel injection valve having direction of injection oriented to inside of said throttle body and which is attached to said support case,
    wherein said support case comprises a cylindrical portion which extends between said cleaner element and said connecting tube, an interior of said cylindrical portion forming said purification chamber,
    wherein a recessed portion is formed in a sidewall of said cylindrical portion by inwardly setting back part of the sidewall,
    wherein said first fuel injection valve is attached to said sidewall of said cylindrical portion such that at least part of said first fuel injection valve is housed inside said recessed portion,
    wherein an attachment hole is provided in a front wall surface of said recessed portion on one side, in a vehicle width direction, of said cylindrical portion,
    wherein a tip end portion of said first fuel injection valve is inserted into said attachment hole,
    wherein an attachment boss is disposed in a projecting manner around said attachment hole, and
    wherein a fuel joint is fixed to said attachment boss, a head portion of said first fuel injection valve being fitted into said fuel joint.

2. The air intake device in a saddle riding type vehicle as recited in claim 1, wherein a guide groove guiding a fuel hose is formed in said sidewall around said recessed portion, the guide groove being continuous with said fuel joint.

3. The air intake device in a saddle riding type vehicle as recited in claim 2, wherein a cover member covering said cleaner element from a lateral side is formed to cover said recessed portion from the lateral side.

4. The air intake device in a saddle riding type vehicle as recited in claim 3,
    wherein a second fuel injection valve is attached to said throttle body, and
    wherein a first fuel guide pipe to guide a fuel toward said second fuel injection valve and a second fuel guide pipe to guide the fuel toward said first fuel injection valve attached to said support case extend from a Y-shaped branched pipe to pass a throttle position sensor attached to said throttle body.

5. The air intake device in a saddle riding type vehicle as recited in claim 1,
    wherein said support case is made of a soft and lightweight material, and wherein a plurality of hook portions configured to be elastically engaged with said fuel joint are provided on said sidewall around said attachment boss.

6. The air intake device in a saddle riding type vehicle as recited in claim 5, wherein a cover member covering said cleaner element from a lateral side is formed to cover said recessed portion from the lateral side.

7. The air intake device in a saddle riding type vehicle as recited in claim 6,
wherein said branched pipe is disposed on a first side, in a vehicle width direction, of said throttle body,
wherein on a second side, in the vehicle width direction, of said connecting tube, a connection pipe is provided at a front end portion of said support case main body,
wherein said second fuel guide pipe connecting said branched pipe and said connection pipe crosses over said connecting tube from above, and
wherein a third fuel guide pipe connecting said fuel injection valve and said connection pipe attached to said support case is disposed inside said support case main body.

8. The air intake device in a saddle riding type vehicle as recited in claim 1, wherein a cover member covering said cleaner element from a lateral side is formed to cover said recessed portion from the lateral side.

9. An air intake device for a saddle riding type vehicle, comprising:
an air cleaner disposed behind a rear cushion unit of the saddle riding type vehicle;
a throttle body disposed in front of the rear cushion unit; and
a connecting tube connecting said air cleaner and said throttle body, said connecting tube being connected to an air intake port of an engine of the saddle riding type vehicle and being placed at a lateral side of the rear cushion unit,
wherein the air cleaner comprises
a cleaner element,
a support case supporting said cleaner element and forming a purification chamber together with said cleaner element, a rear end portion of said connecting tube being connected to said support case, and
a first fuel injection valve having direction of injection oriented to inside of said throttle body and which is attached to said support case,
wherein said support case comprises
a cylindrical support case main body to which a rear end portion of said connecting tube is connected; and
a support frame fastened to a rear end portion of said support case main body,
wherein an element support member is fastened to said support frame,
wherein said cleaner element covers a rear end portion of said support case and is attached to said element support member, and
wherein said first fuel injection valve is attached to said support frame.

* * * * *